Patented Aug. 24, 1937

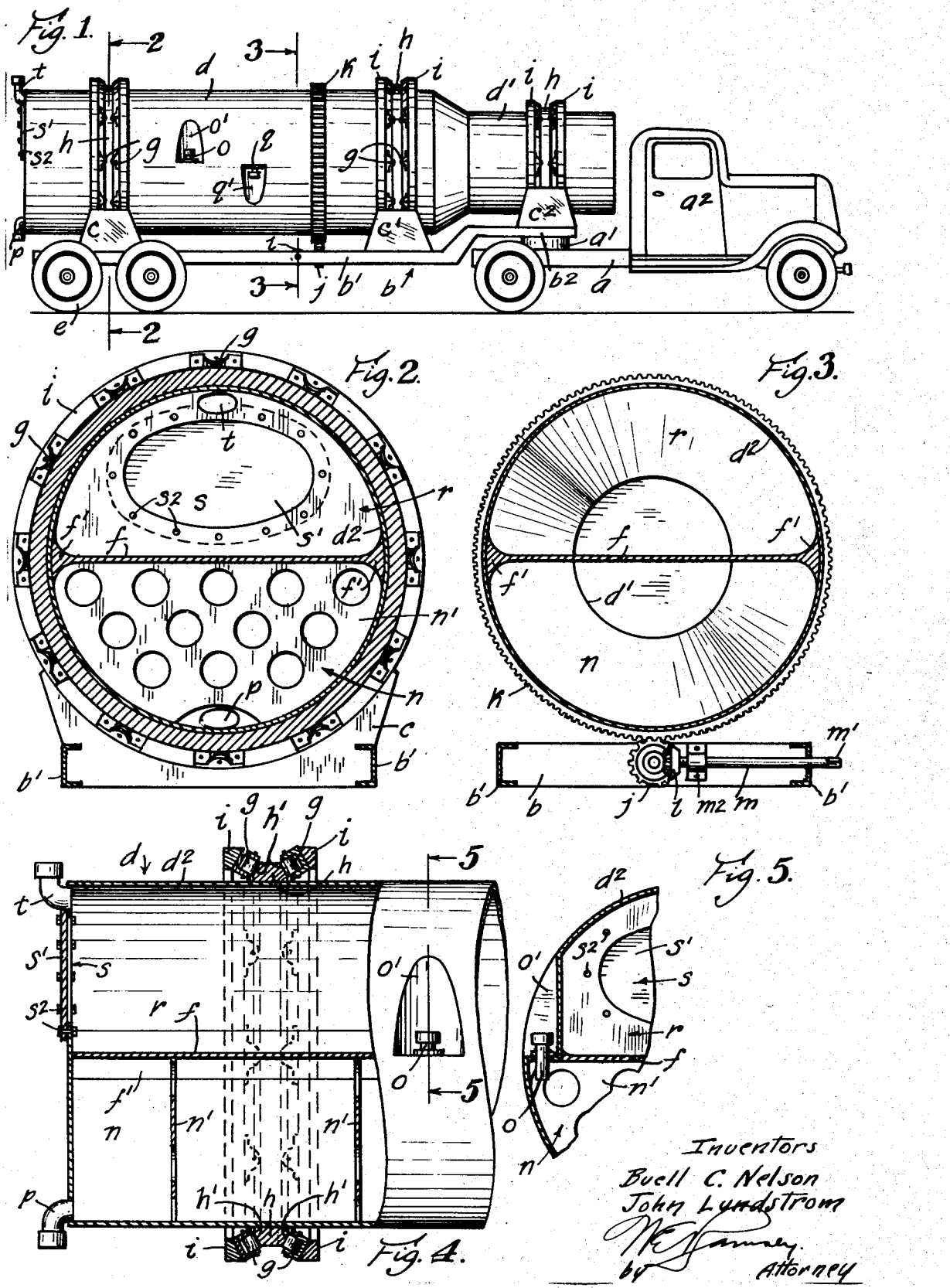

2,090,961

UNITED STATES PATENT OFFICE 2,090,961

DOUBLE COMPARTMENT REVERSIBLE BULK-TYPE CARRIER

Buell C. Nelson and John Lundstrom, Portland, Oreg.

Application June 12, 1936, Serial No. 84,944

4 Claims. (Cl. 280—5)

Our invention relates to cargo carriers and particularly to automobile trucks which are specifically designed at the present time for the purpose of carrying only one specific type of cargo. As an example of this we cite tank trucks and tank cars specifically designed for carrying gasoline and other hydro-carbon products. Said carriers are usually provided for delivering gasoline, for example, from a point of supply or center of distribution into outlying districts. The load carried thus is only a one-way load. It is impractical to fill said containers with a different product because the containers will thus be soiled and rendered unfit for gasolines, and the fumes of gasoline which are retained by said containers would be absorbed by any product placed in said gasoline containers. This is particularly true with food products.

In the Pacific northwest, for example, trucks are used for distributing gasoline from seaport towns into the interior. Said trucks are run with a full load of gasoline into the interior, but must be run empty back to the distributing centers. We are familiar with attempts to remedy the situation by building staked sides and other containers on top of the gasoline containers for carrying sacked wheat, sheep and the like. This expedient is, unsatisfactory because the tank used to transport gasoline is then empty and must support a relatively heavy load. The center of gravity of the combined load and truck is high also and thus dangerous and the curved form of such tank is unsuited to constitute a floor for such auxiliary load carrying compartments.

The object of our invention is to provide a single cargo container with a horizontal partition so as to define two vertically stacked cargo spaces or chambers. The container is rotatable or otherwise movable so that said spaces can be selectively arranged so that either can be arranged lowermost. Said spaces are thus designed so that one load can be carried in one space and when discharged, the container can be rotated or otherwise moved so that the other cargo space is lowermost and can be filled with a dissimilar load.

Inasmuch as one of the greatest uses which we have observed for such vehicle is in connection with the transportation of gasoline, and other liquids, one of said spaces is arranged with an intake spout and a pouring spout while the other space may be arranged similarly or may be arranged with a relatively large aperture provided with a removable cover so that said latter space is susceptible of receiving relatively bulky products of general cargo. Thus, the load in each instance to be transported rests directly upon the frame of the vehicle, the center of gravity of the combined load and vehicle is low and if any part of the cargo becomes spilled, it lies beneath the empty compartment and thus does not tend to run or drain into the latter.

The details of our invention are hereinafter described with reference to the accompanying drawing, in which:

Fig. 1 is a side elevation of a truck and semi-trailer unit embodying our invention;

Fig. 2 is a cross-section taken on the line 2—2 in Fig. 1 and illustrates the manner in which the container is rotatably supported and access is provided into one of the cargo spaces thru a relatively large aperture;

Fig. 3 is a cross-sectional view taken on the line 3—3 in Fig. 1 depicting how operating devices are arranged to rotate said container to arrange either of said cargo spaces lowermost with respect to the frame of the vehicle;

Fig. 4 is a fragmentary rear end view of the container embodying our invention with parts of the side walls shown broken away to disclose structural details; and Fig. 5 is a fragmentary sectional view taken on the line 5—5 in Fig. 4 illustrating how one of the filling spouts may be arranged to lie within the periphery of the container for convenience and safety.

Our invention has been illustrated in a truck and semi-trailer unit although it is not to be considered limited thereto and can be equally efficiently embodied in railroad equipment and similar vehicles adapted to transport bulk cargoes and particularly liquid cargoes.

As illustrated in Fig. 1 our invention is embodied in a vehicle comprising a truck $a$ and a semi-trailer $b$. Said semi-trailer is pivotally secured to said truck in the usual manner at $a'$. At spaced points on the frame $b'$ of the semi-trailer are three cradles $c$, $c'$ and $c2$. Said cradles rotatably support an elongated cylindrical container $d$. Inasmuch as the forward end $b2$ of the semi-trailer is necessarily offset upwardly to ride over the frame of the truck, the forward end $d'$ of said container is of smaller diameter than the remainder. It is desirable to provide a container in a unit of this character which is capable of containing in each storage space a load approaching the maximum permitted by state highway regulations. Thus, the container extends from a point adjacent the rear wheels e of the trailer to a point adjacent the back of the cab a2 of the truck.

Each of the cradles is carried by the frame b' of the semi-trailer although a portion of said container overlies the frame of the truck. The container d is provided with a horizontal partition. Said partition is preferably thickened, strengthened and filleted at the ends f' thereof so that square corners are eliminated and a strong bond and joint is made between the horizontal partition and the peripheral shell d2 of the container. The horizontal partition is joined to said peripheral shell the entire length of the latter. Said partition thus constitutes a tie, strut or support for said container to prevent the latter from becoming out of round under the load supported by it and under undue operating conditions.

The cradles c, c' and c2 are formed with cup-shaped upper faces formed upon a sweep coinciding with the radius of the container. Said cradles are secured to and form a part of the frame of the semi-trailer as is illustrated in Fig. 2. It is preferable that said cradles be provided with a series of spaced rollers g which engage the periphery of the container. To strengthen the container at this point a strengthening ring h encompasses the container and the rollers g engage the sides thereof. The sides of said strengthening rings are preferably inclined at oblique angles to the circumference of the container and also to a plane extending transversely therethru. Said oblique faces h' thus are adapted to support the load of the container and its contents and also are adapted to prevent the longitudinal shifting of said container upon the frame. Each cradle includes two spaced roller supporting rings i spaced apart and carrying said rollers g upon their inner faces.

The container is rotated about its longitudinal axis and is held in fixed position after it is rotated by the engagement of a driving pinion j with an annular gear k extending about the periphery of the container substantially at the middle thereof. The driving pinion is engaged by a miter pinion carried by the end shaft m. Said shaft preferably extends laterally of the frame and one end m' thereof is squared or rendered non-circular in any desired form, thus being adapted for engagement by a crank or other device for rotating the shaft m. This structure is illustrated as adapted for manual manipulation, but it is obviously capable of mechanical or electrical operation. Said shaft is carried by a bearing m2 adjacent the miter pinion and bears in the trailer frame b' at a point adjacent said non-circular end as is illustrated in Fig. 3.

In Fig. 2 the lowermost cargo space n is illustrated as adapted for receiving a liquid cargo and to prevent surge in said space one or more perforated bulk heads n' are provided. A filling spout o for said cargo space n is arranged in the side of the container, being located in a recessed portion o' in the side of said container. A discharge spout p depends from the after end of the container extending below the bottom of said cargo space to permit the entire contents to be drained therefrom. A similar filling spout q is provided for the cargo space r if it is to carry liquids. Said cargo space r is illustrated as being adapted for receiving bulky products, such for example as wheat, wool, fruit or vegetables or similar products as well, such products not being adapted to be fed into said space thru a spout because of their size or because they are normally shipped in large containers. To give access to said cargo space r, we provide a relatively large manhole s normally closed by a removable cover s'. A discharge spout t is also provided for said cargo space r to facilitate the discharge of a fluid cargo, if one is placed therein.

If a load of gasoline, for example, is to be delivered by said vehicle, the container can be arranged as is shown in Fig. 2 and the lowermost cargo space n can be filled with gasoline thru the filling spout o. When the container is full, the filling spout is closed and the load can be transported in the usual manner. The container is preferably proportioned so that each cargo space is capable of holding a maximum load as prescribed by the various state highway regulations covering loads. Inasmuch as the load is contained wholly in the lower half of the container and the weight of the load is substantially greater than the empty container above, the center of gravity of the combined load and the vehicle is quite low, comparing favorably to the standard practice at the present time. When the load is to be discharged at the receiving terminus, it is discharged thru the spout t in the usual manner. A return cargo can then be placed in the other cargo space r. The container is first revolved by the shaft m with its pinions and gears j, k and l, respectively. If a liquid cargo is to be returned this can be done by filling said other cargo space r thru the filling spout q as has been done previously in the filling of the cargo space n. If another type of cargo is to be placed in said space r the manhole cover s' is removed and the cargo is stowed in place thru the manhole s. When said cargo is stowed away the cover is fixed in place by studs s2 or similar fastening devices and the cargo is in shape to be transported to the original terminus.

It is to be noted that the cargo in said container is always in the lowermost half of the container and is carried directly upon the cradles and the horizontal partitions serve as a tie across said container to prevent the latter from becoming out of round. As has previously been pointed out, the center of gravity is maintained low and if there is any leakage or spillage from the said lowermost container it runs onto the frame of the semi-trailer and does not pass into the other cargo space. This is of substantial importance if one of the cargoes transported is gasoline and the return cargo is food stuff. The presence of gasoline in the cargo space r would quickly spoil or depreciate the value of grain or fruit. By maintaining the cargo in the lowermost half of the container, however, this danger is eliminated. Inasmuch as access to the cargo space n can only be had thru the discharge and filling spouts t and o, respectively, even the danger of deterioration from fumes arising from said space is minimized. It is to be noted that the filling and discharge spouts of the two cargo spaces are separated rather widely and face in opposite direction and thus there cannot be inadvertent spilling of one material into the other cargo space.

What is claimed is:

1. A vehicle of the character described comprising a container provided with a horizontal sealing partition defining two separated vertically stacked chambers therein each adapted to hold a different material, one being a fluid and means for moving and fixing the container so that the relative positions of the chambers can be selectively reversed with respect to each other, the lowermost only carrying a cargo.

2. A vehicle of the character described comprising a container provided with a horizontal sealing partition defining two separated vertically stacked chambers therein each adapted to hold a different material, one being a fluid, means for moving and fixing the container so that the relative positions of the chambers can be selectively reversed with respect to each other, each of said chambers being provided with separate intake and discharge apertures, said apertures being operatively arranged in a chamber only when said chamber is arranged in lowermost or cargo carrying position.

3. A vehicle of the character described comprising a container provided with a horizontal sealing partition defining two separated vertically stacked chambers therein each adapted to hold a different material, one being a fluid, means for moving and fixing the container so that the relative positions of the chambers can be selectively reversed with respect to each other, each of said chambers being provided with a separate intake and discharge aperture said apertures being operatively arranged in a chamber only when said chamber is arranged in lowermost or cargo carrying position, the apertures for each of the chambers being spaced from the other and facing in opposite directions.

4. A vehicle of the character described comprising a cylindrical container provided with a horizontal sealing partition defining two separated vertically stacked chambers therein each adapted to hold a different material, one being a fluid, said container being rotatably mounted with its central axis extending horizontally, and longitudinally of said vehicle, means for rotating and fixing the container so that the relative positions of the chambers can be selectively reversed with respect to each other the lowermost chamber only carrying cargo, each of said chambers provided with separate intake and discharge apertures, said apertures being operatively arranged in a chamber only when said chamber is arranged in lowermost or cargo carrying position, one of said chambers being provided with an aperture having a removable closure device, said aperture being of relatively large area and adapted to accommodate the passing of bulk objects into and out of said chamber.

BUELL C. NELSON.
JOHN LUNDSTROM.